(12) United States Patent
Stacy

(10) Patent No.: US 9,334,198 B2
(45) Date of Patent: May 10, 2016

(54) AERATED COMPOST TEA BREWER

(71) Applicant: Russell Allen Stacy, Minneapolis, MN (US)

(72) Inventor: Russell Allen Stacy, Minneapolis, MN (US)

(*) Notice: Subject to any disclaimer, the term of this patent is extended or adjusted under 35 U.S.C. 154(b) by 129 days.

(21) Appl. No.: 13/999,490

(22) Filed: Mar. 4, 2014

(65) Prior Publication Data

US 2015/0251965 A1 Sep. 10, 2015

Related U.S. Application Data

(60) Provisional application No. 61/851,676, filed on Mar. 12, 2013.

(51) Int. Cl.
*C05F 17/02* (2006.01)
*C05F 17/00* (2006.01)

(52) U.S. Cl.
CPC ............. *C05F 17/02* (2013.01); *C05F 17/0018* (2013.01); *C05F 17/0205* (2013.01); *C05F 17/0276* (2013.01); *C05F 17/0294* (2013.01); *Y02P 20/145* (2015.11); *Y02W 30/43* (2015.05)

(58) Field of Classification Search
CPC .. C05F 17/02; C05F 17/0205; C05F 17/0294; C05F 17/0018; C05F 17/0276; Y02W 30/43; Y02P 20/145
USPC ............................................ 435/290.1, 290.2
See application file for complete search history.

(56) References Cited

U.S. PATENT DOCUMENTS

| | | | | |
|---|---|---|---|---|
| 6,727,090 | B1* | 4/2004 | Hronek | C05F 9/04 210/167.01 |
| 6,767,381 | B2* | 7/2004 | Huhn | C05F 9/04 435/290.1 |
| 7,727,758 | B1* | 6/2010 | Posthuma | C05F 17/0018 435/289.1 |
| 9,174,884 | B1* | 11/2015 | Fingerle | C05F 17/0276 |
| 2004/0032032 | A1* | 2/2004 | Erickson | B01F 3/04539 261/93 |
| 2012/0064618 | A1* | 3/2012 | Winslow | C05F 9/02 435/290.1 |

* cited by examiner

*Primary Examiner* — Kevin R Kruer
(74) *Attorney, Agent, or Firm* — Brooks, Cameron & Huebsch, PLLC

(57) ABSTRACT

An aerated compost tea brewer (ACTB) is an apparatus for brewing compost tea from an aqueous compost mixture using either or both air and water pumps to circulate and aerate compost tea.

9 Claims, 4 Drawing Sheets

AERATED COMPOST TEA BREWER

This application claims the benefit of provisional U.S. patent application No. 61/851,676 with a filing date of Mar. 12, 2013 previously filed by inventor and applicant Russell Stacy and entitled Aerated Compost Tea Brewer, and further this application claims priority date of provisional U.S. patent application No. 61/851,676 with a filing date of Mar. 12, 2013 for this non-provisional patent application likewise titled Aerated Compost Tea Brewer.

BACKGROUND

Actively aerated compost tea is a microorganism and nutrient-enriched liquid compost extract or "tea" obtained by mixing compost, natural fertilizers, and water. The tea is used commercially and by home gardeners to quickly provide nutrients to plants either through application of the tea to plants as a foliar spray, or through application of the tea to a hydroponic system, or to the soil around the plants. Due to the diversity and abundance of aerated soil organisms found therein, aerated compost tea can rejuvenate naturally occurring soil microbe and other beneficial soil organism populations.

The agricultural benefits of compost tea include production and delivery of soil microorganisms that live symbiotically with plants by dissolving soil nutrients and providing these nutrients to the root systems of plants. By providing proper nutrition in this way, compost tea strengthens the innate immune response of plants thus protecting plants from root and foliar diseases. Growers are benefited economically through cost savings found by cycling nutrients from organic waste back into soils through composting. Further cost savings are realized when growers brew compost into tea thereby dissolving compost nutrients and beneficial micro-organisms into a liquid that can be easily applied utilizing normal farm, garden, and landscaping equipment as a way to deliver nutrition and beneficial microorganisms to larger areas under cultivation than could be reached utilizing compost alone.

Compost tea has emerged as a viable alternative to chemical fertilizers. There are numerous examples of agricultural and horticultural use of compost tea. Organic farmers commonly utilize compost tea as a fertility input. Practitioners of bio-dynamic farming and permaculture landscape management utilize many different compost tea recipes. Organically focused landscape management companies and plant nurseries have turned to compost tea as a primary source of fertility. Similarly, compost tea has gained popularity among fine gardening practitioners and backyard gardeners alike. Compost teas have also rapidly become a standard fertility input utilized by lawn care companies that specialize in natural lawn care.

DESCRIPTION OF THE PRIOR ART

Generally apparatus for aerated compost tea production are comprised of means for agitating an aqueous mixture of compost and water while introducing air into the mixture.

As an example of a prior art device for making compost tea, U.S. Pat. No. 6,727,090 Hronek describes an apparatus in which compost held in a first enclosure or housing is washed with water to extract micronutrients. The extract solution is then collected in a tank positioned below the housing and recirculated through the compost until the desired concentration is achieved.

Another example of a prior art device for making compost tea is U.S. Pat. No. 6,168,949 to Rubenberger which describes an apparatus wherein a fermentation broth is circulating from the bottom of a tank to a discharge nozzle above the upper surface of the broth in the tank where the broth is discharged into the tank. A pump is used to convey the broth from the bottom of the tank to the discharge nozzle.

Another example of a prior art device for making compost tea is U.S. Pat. No. 6,649,405 to Alms et al. which describes an apparatus in which compost is placed in bags that are immersed in a tank of water. Air bubbles are then discharged from adjacent the bottom of the tank to agitate the water and extract microorganisms from the compost.

Another example of a prior art device for making compost tea is U.S. Pat. No. 6,767,381 Huhn which describes a compost tea production apparatus in which compost is placed in a basket above the water in a tank. A conduit extends within the tank from a lower end to an upper end above the basket. Compressed air is pumped into the conduit adjacent its lower end to convey water up to and out of the upper end of the conduit, where the water falls into the top of the basket.

Another example of a prior art device for making compost tea is U.S. Pat. Application No. 20,070,059,819 Storch, which describes an apparatus in which compost tea is produced in a tank with a conical shaped bottom in which an aqueous compost mixture is agitated in a vortex pattern using only air bubbles as a means to circulate the mixture during fermentation.

These prior art devices are suitable for small-scale compost tea production, however these prior art devices are inefficient and therefore not suitable for industrial scale compost tea production. There are many examples of inefficiencies found in the prior art.

An example of inefficiency found in prior art devices is that they become obstructed during use if used with normal compost produced in backyard, farm, and industrial scale composting operations. Normally produced compost contains large particulate matter greater than 3 millimeters in diameter. Prior art devices easily become clogged during compost tea production as they do not thoroughly filter compost solids as a part of compost tea production.

Another example of inefficiency of these prior art devices is that they will produce compost tea that contains particulate matter capable of clogging spray nozzles on farm equipment and liquid fertility spraying devices. Compost tea containing particulate matter greater than 0.25 millimeters in diameter can obstruct spray nozzle openings for common liquid fertilizer spraying devices.

Another example of the inefficiency of these prior art devices is that they are difficult to clean after use.

Prior art devices also present an inability to efficiently perform continuous multiple batch brewing of compost tea.

Prior art devices are also inefficient due to their inability to thoroughly agitate the liquid tea.

BRIEF SUMMARY OF THE INVENTION

The aerated compost tea brewer (ACTB) provides a compost tea production apparatus that can more thoroughly and efficiently agitate liquid during the compost tea brewing process in order to more economically produce aerated compost tea unlike traditional compost tea production devices. Likewise, unlike some prior art devices, ACTB can easily be used with large particulate matter size compost as is normally produced in backyard, farm, and industrial scale composting operations. Similarly, unlike some prior art devices the ACTB can produce compost tea free of particulate matter greater than 0.25 millimeters in size, thus producing compost tea that is ready for use with common liquid fertility spraying devices. Additionally, unlike the prior art devices, ACTB can be used for uninterrupted continuous brewing of multiple batches of compost tea. Unlike prior art examples, ACTB is easily cleaned after use.

DETAILED DESCRIPTION

Figure 1:
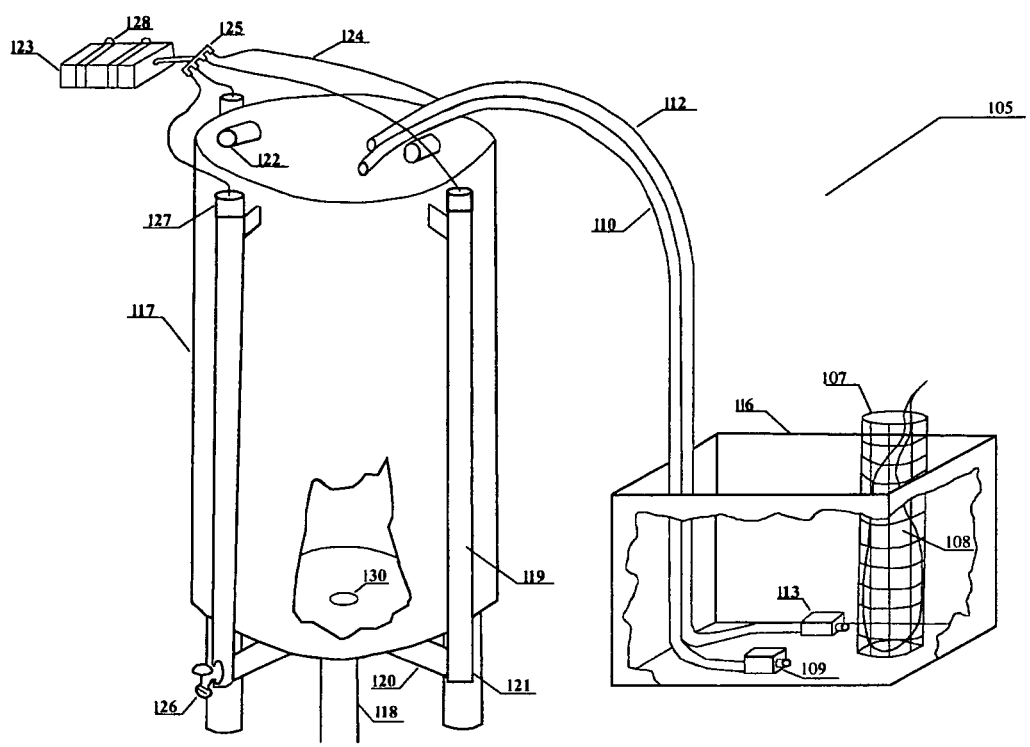
FIG. 1 is an example of a side perspective view of an ACTB.

In the following description, terms such as bottom, beneath, within, inside, above, and below are used solely for the purpose of clarity in illustrating ACTB, and should not be taken as words of limitation.

The figures herein adhere to a numbering convention in which the first digit or digits correspond to the drawing figure number and the remaining digits identify an element or component in the drawing. Similar elements or components amongst different figures may be identified by the use of similar digits. Elements shown in the various examples herein can be added, exchanged, and/or eliminated so as to offer a number of additional examples of the present disclosure.

Additionally, the proportion and the relative scale of the elements provided in the figures herein are intended to illustrate the examples of the present disclosure, and should not be taken in a limiting sense. As used herein, "a number of" an element and/or component can refer to one or more of such elements and/or components.

Referring now to the drawings, FIG. 1 is shown with a portion of the tank cut away to show the tank interior, and with some of the plumbing components shown in phantom lines.

Figure 2:
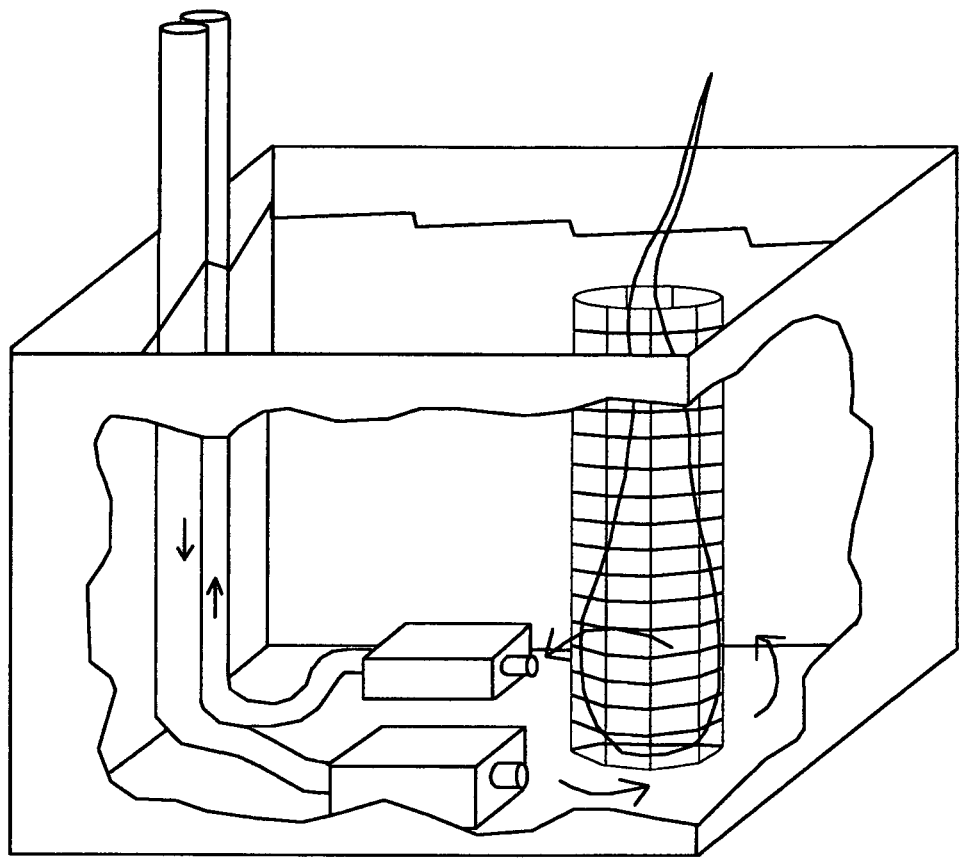
FIG. 2 is an example of a side perspective view of the compost submersion reservoir.

FIG. 2 is shown with a portion of the compost submersion reservoir cut away to show the reservoir interior and with directional arrows to display the movement of liquid therein.

Figure 3:
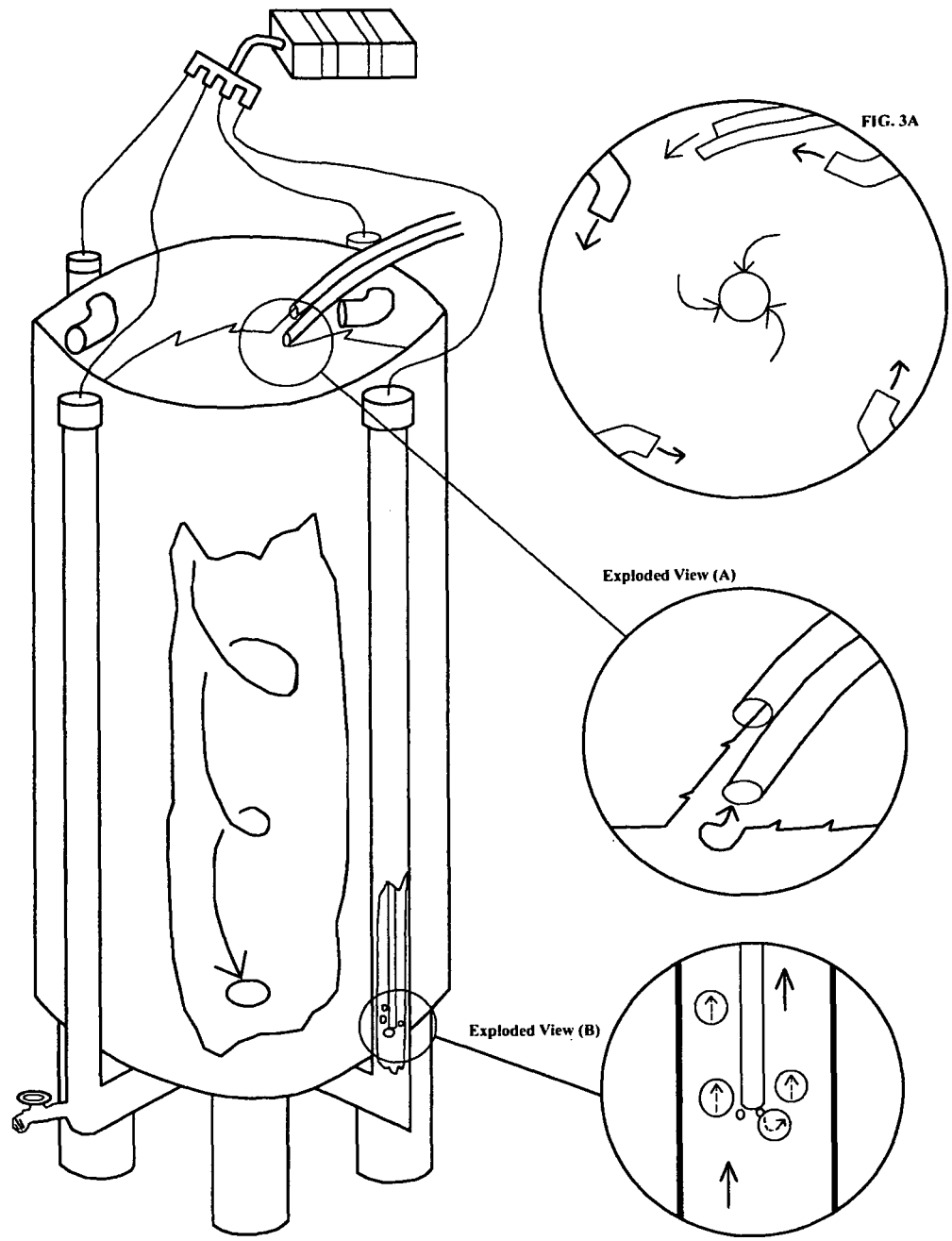
FIG. 3 is an example of a side perspective view of the agitation reservoir.

FIG. 3 is shown with two exploded views detailing the movement of liquids and gasses through the agitation reservoir.

FIG. 3A is a top perspective view of the agitation reservoir detailing the action of the liquid therein.

Referring now specifically to FIG. 1, the ACTB 105 includes a compost submersion reservoir 116 and an agitation reservoir 117. There can be a relationship between the size of compost submersion reservoir 116 and agitation reservoir 117. Compost submersion reservoir 116 and agitation reservoir 117 can be of any appropriate size. Reservoirs may or may not include a cover. Compost submersion reservoir 116 is shown as cuboid in form, but can be cuboid or cylindrical or can be various other forms in numerous examples of ACTB 105. Agitation reservoir 117 is pictured as cylindrical in form, but can be cylindrical or conical or can be various other forms in numerous examples of ACTB 105. In one example, agitation reservoir 117 has a circular cross section and a central drain 130 in the bottom center. Examples of construction materials for compost submersion reservoir 116 and agitation reservoir 117 include high quality, strong, and easily cleaned ultra-violet resistant plastic, or stainless steel or other materials.

Agitation reservoir 117 is a vortex pattern agitation chamber and as such is plumbed for constant liquid flow with a plurality of equidistant external conduit sections 119. In the example provided in FIG. 1, external conduit sections 119 extend from below central drain 130 in bottom of agitation reservoir 117. External conduit sections further extend to above the top of the agitation reservoir 117 at the surface of the liquid. As used herein, the top of the agitation reservoir 117 refers to the agitation reservoir 117 at the surface of the water in the agitation reservoir 117.

Agitation reservoir 117 can further include conduit sections 120 that extend radially outward from circular discharge opening 130 to distal ends 121 beyond the circumference of the agitation reservoir 117 and second conduit sections 119 that extend upwardly from the distal ends 121 of first conduit sections 120 to discharge openings 122 near the top of the agitation reservoir 117 at the surface of the liquid.

At one or more distal ends 121 of first conduit sections 120 can be located drain valve 126.

The agitation reservoir 117 further includes an air supply pump 123 located elevated above agitation reservoir 117. A plurality of air tubing hoses 124 attach to air supply pump 123 via connection through air distribution module 125. Air tubing hoses 124 continue from air distribution module 125 through end cap 127. Air tubing hoses 124 terminate inside external conduit section 119. Air supply pump 123 is shown with wall mount brackets 128. The wall mount brackets 128 shown in the figures are exemplary of one example of ACTB 105 only. Air supply pump 123 can alternately be mounted to the tank itself or at other locations. All air and water plumbing connections are held fast with various adhesives, fasteners, pressure fittings, or other means as may be needed in a given application in order to allow for connectivity and reliable fastening of plumbing connections.

In a number of examples, agitation reservoir 117 can be supported by external frame 118. The frame 118 is not necessary on all examples of ACTB 105 and is illustrated herein as being representative of one example of ACTB 105. Further examples of ACTB 105 can include mounting devices for placement on walls. ACTB 105 can also include mounting devices for hanging from ceilings or rafters. Still further examples of mounting devices can include equipment and devices suitable for mounting ACTB 105 onto tractors, vehicles, or other farm equipment.

Various examples of ACTB 105 can include multiple agitation reservoirs 117 plumbed to one another. As an example, an urban landscaping company that needs to evaporate away or cure off chlorine or other anti-microbial from the city water they use for compost tea. Plumbing multiple agitation reservoirs 117 fluidly together allows for one or more water curing chambers. Another example of the ACTB 105 can include multiple agitation reservoirs 117 plumbed together as a means of increasing production of compost tea. In other examples, multiple agitation reservoirs can be plumbed together as a means of diluting a concentrated compost tea product.

In yet another example, ACTB 105 can include multiple agitation reservoirs 117 connected so as to provide a means of blending multiple compost tea recipes. A fine gardening company may wish to provide fertility for both shrubs and herbaceous plants with one spray treatment. In this example, ACTB 105 can include more then one agitation reservoir 117 temporarily or permanently plumbed together in order to blend various compost tea recipes together prior to application.

In a number of examples, central drain 130 can be held fast with a waterproof seal at the bottom of agitation reservoir 117. Central drain 130 can be located at the center of agitation reservoir 117 and can connect to first conduit sections 120 to allow for conveyance of liquid through central drain 130 and into connected liquid plumbing.

In a number of examples of ACTB 105, drain valve 126 can be a ball valve or alternately a gate valve or other type of valve and can be constructed of durable plastic, brass, or other material. Drain valve 126 can be used to drain finished product from agitation reservoir 117 and thus can include an outlet that can be connected with appropriate fittings to hoses and the like.

ACTB 105 can include a compost submersion reservoir 116, with compost filter basket 107, and mesh bag 108 for compost solids filtration. Liquid plumbing parts within compost submersion reservoir 116 can include reverse direction water pump 109 and low pressure water pump 113. Liquid plumbing parts within compost submersion reservoir 116 can also include inflow liquid plumbing tube 110 and outflow liquid plumbing tube 112. Agitation reservoir 117 can be permanently or temporarily plumbed to compost submersion reservoir 116 via inflow liquid plumbing tube 110 and outflow liquid plumbing tube 112.

Various examples of ACTB 105 can include multiple compost submersion reservoirs 116. As an example, a farmer may want to include more then one type of compost in their compost tea. In one example of ACTB 105 there are multiple compost submersion reservoirs 116 plumbed together with one or more agitation reservoirs 117.

Turning now to FIG. 2 representing an example of the steady state operation and further detailing embodiments within compost submersion reservoir 116. FIG. 2 illustrates the direction of liquid flow through compost submersion reservoir 116.

Compost filter basket 107 can be temporarily or permanently within the interior of the compost submersion reservoir 116. Compost filter basket 107 can be made of a punched plastic material having appropriately sized openings (as an example, 20 mesh) for containing and supporting upright placement of compost in mesh bag 108 while allowing rapid flow of water through the compost basket. Basket 107 can be attached to side, bottom, or lid of compost submersion reservoir interior in various examples of ACTB 105. Basket 107 can be used to contain and support mesh bag 108. Examples of the ACTB 105 can alternately include or not include basket 107 or mesh bag 108. Mesh bag 108 can be used to contain compost solids during compost tea brew process.

Reverse direction water pump 109 can be configured such that it conveys liquid from agitation reservoir 117 through inflow liquid plumbing tube 110 and into compost submersion reservoir 116.

Water pump 113 can be configured such that it conveys liquid from compost submersion reservoir through outflow liquid plumbing tube 112 and into agitation reservoir 117. In some examples of ACTB 105 water pump 113 can flow constantly, or in some examples of ACTB 105 can alternately flow intermittently. A timing device can also activate some examples of ACTB 105 by remotely turning on water pump 113. As an example, if an industrial scale compost tea producer wished to have compost tea brewing over the weekend for use during the week, pump 113 as well as pump 109 and air pump 123 can be activated simultaneously or independently via a timing device or other trigger or switch.

In one example of ACTB 105 liquid plumbing tubes 110 & 112 are constructed of flexible vinyl tubing, but can alternately be constructed of rigid PVC tubing or other materials. Numerous commercially available low-pressure pumps are adequate for use with ACTB 105. Exemplary models are manufactured by Danner MFG, Inc. of Islandia, N.Y. There are many other comparable pumps available on the market.

Likewise, numerous commercially available reverse direction water pumps are also adequate for use with ACTB 105. Reverse direction pump 109 can alternately be replaced with low-pressure water pump such as water pump 113, or other suitable pump in various examples of ACTB 105.

Due to incorporation of mesh bag 108 into embodiments of ACTB 105, compost solids are kept restrained within mesh bag 108 and do not flow into agitation reservoir 117. It will be understood that ACTB 105 can be used for continuous, uninterrupted multiple batch brewing of compost tea. It will be further understood that vortex pattern of circulation within agitation reservoir 117 agitates with improved efficiency due to inclusion of mesh bag 108 in compost submersion reservoir 116.

Turning now to FIG. 3 representing the functions and further detailing the embodiments of agitation reservoir 117. An air supply pump 123 conveys air through air distribution module 125 and into plurality of air tubing hoses 124. Air tubing hoses 124 direct air to bottom of second conduit sections 119.

In a number of examples of ACTB 105, multiple air supply pumps 123 can be included. As an example, an industrial scale compost tea producer may wish to add additional aeration to their compost tea. ACTB 105 can include one or more air supply pumps 123 as a means of adding additional aeration. Aeration can also be increased throughout ACTB 105 via tubing, air stones, or other air transference devices and mechanisms.

There are a number of examples of commercially available air pumps which are suitable for use with ACTB 105. One exemplary model is distributed by Sunlight Supply, Inc. and sold under the model name Air Force Pro. There are a number of examples of suitable air pumps available on the market and various air pump sizes will be appropriate in various given circumstances.

There are a number of examples of suitable construction materials from which to construct ACTB 105 components. In an example of the embodiments disclosed herein air distribution module 125 can be constructed of durable plastic or alternately from metal. Air-tubing hoses 124 can be constructed of flexible vinyl tubing or other materials. End caps 127 can be constructed of flexible rubber or other material that can allow a tight seal where second conduit sections 119 and air-tubing hoses 124 meet. Central drain 130, first conduit sections 120, distal ends 121, second conduit sections 119, and discharge openings 122 can be constructed of rigid PVC tubing or alternately of metal tubing or other materials.

In some examples of ACTB 105, commencement of start up procedure can work as follows. Reverse flow pump 109 can be connected to an electrical source and initialized in the opposite direction of steady state flow. It will be appreciated that when liquid flow from reverse pump 109 is initialized in opposite direction of steady state flow, liquid will be conveyed from compost submersion reservoir 116 and into inflow tube 110 thus evacuating any air trapped in inflow tube 110. It will be further appreciated that when air is fully or partially evacuated from inflow tube 110, direction of flow through pump 109 can at that time be reversed in order to begin syphon action in inflow tube 110 required for steady state operation. Syphon action through inflow tube 110 can alternately be initialized via other means. At the same time which syphon action begins in inflow tube 110, air pump 123, as well as water pump 113 are initialized thus completing start up procedure.

There are many examples of start up possible procedures for ACTB 105. As one example, ACTB 105 can alternately be commenced via a timing mechanism, device, or computer assisted timing device. An on-site operator or a remote device can alternately start reverse flow pump 109, pump 113 and, or air pump 123.

Upon completion of start up procedure, a water curing process can be desirable in various applications. Antimicrobial agents commonly found in tap water such as chlorine are detrimental to compost tea production. Chlorine treated tap water can be cured by operation of ACTB 105 for between twelve and twenty four hours prior to introduction of compost or compost tea ingredients. At such time as operator of ACTB 105 deems water in reservoirs ready for use, compost solids and solid fertility additives can then be added into mesh bag 108. Mesh bag 108 can be placed into compost basket 107 thus restraining and submerging or sometimes partially submerging solid compost and fertility additives. It will be appreciated that restraint of compost solids in this manor allows for easy cleaning of ACTB 105 as compost solids cannot be conveyed into plumbing parts and pumps.

It will be appreciated that the combined flow of liquid through pumps 109 & 113 is sufficient to consistently agitate the amount of liquid contained in compost submersion reservoir 116.

It will also be appreciated that the combined conveyance of liquid to and from pumps 109 & 113 is sufficient to thoroughly extract nutrient and beneficial microorganisms from compost due to rapid conveyance of liquids through compost filter basket 107 and through compost contained in mesh bag 108.

As is demonstrated in exploded view (A) of component parts illustrated in FIG. 3, it will be appreciated that when liquid is conveyed out of agitation reservoir 117 through inflow tube 110 at such a pace that the liquid surface layer within agitation reservoir 117 falls below the termination of inflow tube 110, conveyance of liquid from outflow tube 112 atop inflow tube 110 extends surface layer of liquid in agitation reservoir 117 above termination of inflow tube 110 thus allowing water pressure to be evenly maintained in inflow tube 110. Said another way, plumbing between the two reservoirs can self regulate as inflow tube 110 does not choke from lack of liquid even when liquid levels in agitation reservoir 117 begin to drop below reach of inflow tube 110 due to consistent liquid supplied from adjacent outflow tube 112. Said yet another way, both reservoirs can maintain an even and consistent level of liquid due to the simultaneous actions of the pumps and the proximate placement of the inflow tube 110 and outflow tube 112.

As is demonstrated in exploded view (B), it will also be appreciated that liquid displacement due to forced air introduction can convey liquid upward in second conduit sections 119 and liquid can further be conveyed through discharge openings 122 into agitation reservoir 117.

It will further be appreciated that due to cylindrical form of agitation reservoir 117, as well as centrality of drain 130 in bottom of agitation reservoir 117, and angle of discharge openings 122, and due also to rapid conveyance of liquid through discharge openings 122, liquids in agitation reservoir 117 are rapidly and completely agitated in a vortex pattern.

In one example ACTB 105 can concurrently circulate liquids between compost submersion reservoir 116 and agitation reservoir 117.

Aeration can occur in agitation reservoir 117 via surface aeration from water falling out of discharge openings 122 and also via subsurface aeration through air bubbles introduced from air pump 123 and through air hoses 124 into conduits 119 that connect to agitation reservoir 117. In other examples of ACTB 105 Aeration can also occur due to introduction of air via other means such as additional air pumps, air stones, or waterfall or spray mechanisms or techniques. Due to high oxygen concentration in the compost tea, desirable aerobic organisms are favored while the growth and reproduction of anaerobic microorganisms is inhibited.

Concurrent washing of nutrients and microorganisms into water coupled with rapid agitation and complete aeration of compost tea allows for the production of a superior quality compost tea within fifteen to twenty four hours.

Continuous multiple batch brewing of compost tea can be easily accomplished using ACTB 105. By temporarily shutting off all pumps, then draining off an amount of finished compost tea, compost can be removed from mesh bag 108. Mesh bag 108 can then be refilled with fresh compost, and the water level in reservoirs 116 & 117 can be refilled. Filling both reservoirs once again with water and adding in new compost in mesh bag 108 and once again repeating start up procedures will lead to a rapid reinvigoration of the brew and allow for continuous brewing of multiple batches. Already finished compost tea product kept in reservoirs will rapidly repopulate the microorganism populations throughout the new batch of compost tea and can produce a compost tea within 10 to 18 hours. Ongoing brewing cycles can occur in this manner without pause, thus allowing for industrial scale compost tea production.

Finished compost tea can be drained through drain valve 126. Alternately compost tea can be removed from reservoirs 116 & 117 via other drains, pumps, scoops, tubing or valves. If any finished compost tea remains in compost submersion reservoir 116, pump 113 can be activated to convey all finished product into agitation reservoir so it can easily drain out through drain valve 126.

The tea system can be easily cleaned by first removing end caps 127 and compost solids in mesh bag 108, then flushing plumbing and reservoirs with water and finally scrubbing any residues left on tank sidewalls.

Figure 4:
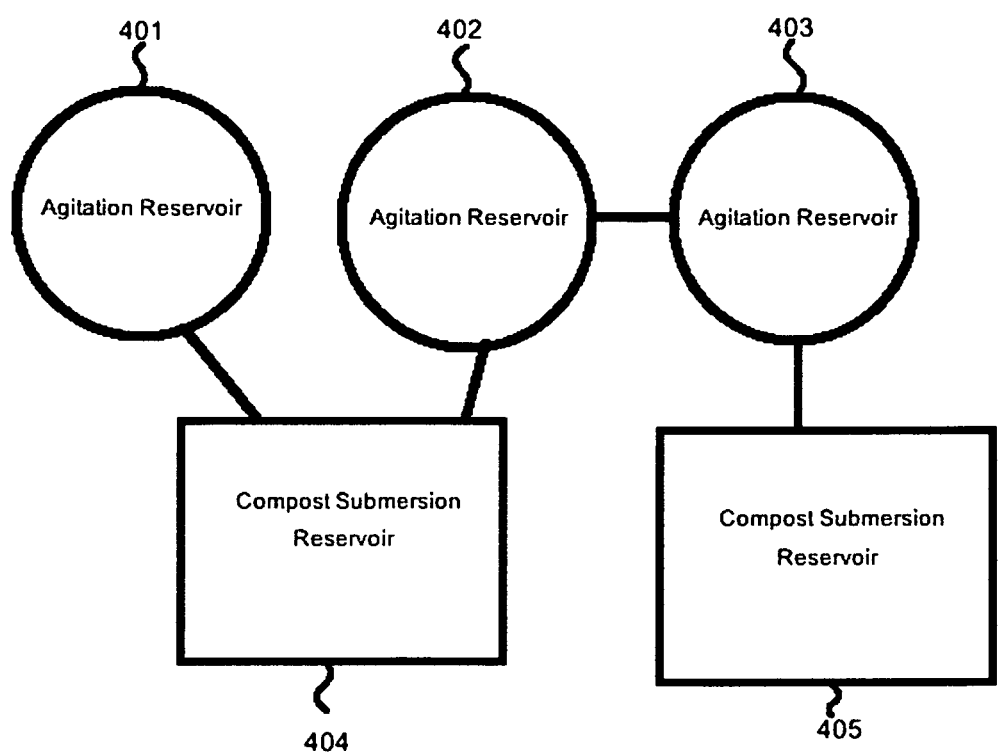
FIG. 4 is a block diagram illustrating an example of an apparatus in the form of an ACTB system.

Turning now to FIG. 4 illustrating an example of one possible ACTB system configuration. There are numerous examples of possible configurations of ACTB. As is illustrated in FIG. 4, reservoirs used as a part of ACTB system can be arranged in a number of different possible configurations. In this configuration, agitation reservoirs 401 and 402 as well as compost submersion reservoir 404 can be used for brewing a different compost tea recipe then is brewing in agitation reservoir 403 and compost submersion reservoir 405. In this example, as brewing process is completed, both recipes can be combined before application. FIG. 4 is meant to be illustrative of one of the numerous examples and configurations for ACTB systems.

The drawings are for the purpose of illustrating the components and steady state functioning of the ACTB 105 and are not intended to be to scale.

In view of the many possible embodiments to which the principles of ACTB 105 can be applied, it should be recognized that the detailed embodiments are illustrative only and should not be taken as limiting the scope of the ACTB 105. Rather, I claim as my apparatus all such embodiments as may come within the scope and spirit of the following claims and equivalents thereto.

What is claimed:
1. An apparatus, comprising:
a compost submersion reservoir;
a compost tea agitation reservoir, physically separate from the compost submersion reservoir;
a first pump to move liquid along a first tube from the compost tea agitation reservoir into the compost submersion reservoir; and a second pump to move liquid along a second tube, located atop the first tube, from the compost submersion reservoir to the compost tea agitation reservoir, wherein a liquid pressure within the first tube is held consistent by drawing a first portion of liquid through the termination of the first end of the first tube from liquid expelled from the first end of the second tube and a second portion of liquid from liquid held in the agitation reservoir, and wherein a simultaneous liquid conveyance through the first tube and the second tube maintains a consistent level of liquid in the compost submersion reservoir and in the compost tea agitation reservoir.

2. The apparatus of claim 1, wherein the apparatus includes a compost filter basket to hold compost at least partially submerged in liquid.

3. The apparatus of claim 1, wherein the apparatus is configured for mobile deployment by mounting on farm equipment.

4. The apparatus of claim 1, wherein the apparatus is configured to aerate compost tea by agitation in the agitation reservoir, conveying liquid from the from the agitation reservoir to the compost submersion reservoir, washing an at least partially submerged amount of compost in the compost submersion reservoir, and conveying liquid from the compost submersion reservoir to the agitation reservoir.

5. The apparatus of claim 1, wherein the apparatus is configured to process water for curing off antimicrobial agents.

6. The apparatus of claim 1, wherein the first pump and the second pump are submerged in the compost submersion reservoir.

7. The apparatus of claim 1, wherein the agitation reservoir agitates the liquid in a vortex pattern.

8. The apparatus of claim 7, further comprising an air pump configured to propel liquid to agitate in the vortex pattern.

9. The apparatus of claim 1, wherein a termination of a first end of the second tube occurs longitudinally prior to a termination of a first end of the first tube.

* * * * *